United States Patent
Hall et al.

(10) Patent No.: US 9,440,572 B2
(45) Date of Patent: Sep. 13, 2016

(54) HEATING, VENTILATION, AND AIR CONDITIONING SEAT ASSEMBLY

(71) Applicants: David R. Hall, Provo, UT (US); Stephen Hall, Draper, UT (US); Russ Winder, South Jordan, UT (US); Drake Taylor, Provo, UT (US)

(72) Inventors: David R. Hall, Provo, UT (US); Stephen Hall, Draper, UT (US); Russ Winder, South Jordan, UT (US); Drake Taylor, Provo, UT (US)

(*) Notice: Subject to any disclaimer, the term of this patent is extended or adjusted under 35 U.S.C. 154(b) by 0 days.

(21) Appl. No.: 14/278,556

(22) Filed: May 15, 2014

(65) Prior Publication Data
US 2015/0329026 A1 Nov. 19, 2015

Related U.S. Application Data

(60) Provisional application No. 61/825,465, filed on May 20, 2013.

(51) Int. Cl.
*A47C 7/74* (2006.01)
*B60N 2/70* (2006.01)
*B60N 2/56* (2006.01)

(52) U.S. Cl.
CPC .............. *B60N 2/70* (2013.01); *B60N 2/5614* (2013.01); *B60N 2/5621* (2013.01); *B60N 2/5657* (2013.01)

(58) Field of Classification Search
CPC .................................................. B60N 2/5614
USPC ....................................... 297/180.13, 180.14
See application file for complete search history.

(56) References Cited

U.S. PATENT DOCUMENTS

| | | | |
|---|---|---|---|
| 4,997,230 A | 3/1991 | Spitalnick | |
| 5,715,695 A | 2/1998 | Lord | |
| 5,918,930 A | 7/1999 | Kawai et al. | |
| 6,179,706 B1 * | 1/2001 | Yoshinori et al. | ... 297/180.14 X |
| 6,277,023 B1 | 8/2001 | Schwarz | |
| 6,481,801 B1 * | 11/2002 | Schmale | ............. 297/180.14 X |
| 6,578,910 B2 * | 6/2003 | Andersson et al. | . 297/180.13 X |
| 6,685,553 B2 * | 2/2004 | Aoki | ..................... 297/180.14 X |
| 6,761,399 B2 | 7/2004 | Bargheer et al. | |
| 6,976,734 B2 | 12/2005 | Stoewe | |
| 7,075,034 B2 | 7/2006 | Bargheer et al. | |
| 7,201,441 B2 | 4/2007 | Stoewe et al. | |
| 7,213,876 B2 | 5/2007 | Stoewe | |
| 7,287,812 B2 * | 10/2007 | Ishima et al. | ............ 297/180.14 |
| 7,328,944 B2 | 2/2008 | Hajduczyk | |
| 7,338,117 B2 | 3/2008 | Iqbal et al. | |
| 7,356,912 B2 | 4/2008 | Iqbal et al. | |
| 7,475,938 B2 | 1/2009 | Stoewe et al. | |
| 7,503,625 B2 | 3/2009 | Bargheer et al. | |
| 7,506,924 B2 | 3/2009 | Bargheer et al. | |
| 7,618,089 B2 | 11/2009 | Stoewe et al. | |
| 7,621,135 B2 | 11/2009 | Kadle et al. | |
| 7,708,626 B2 | 5/2010 | Bargheer et al. | |
| 7,873,451 B2 | 1/2011 | Hartmann et al. | |
| 8,002,344 B2 | 8/2011 | Abe et al. | |
| 8,662,579 B2 | 3/2014 | Yoshizawa et al. | |
| 8,672,411 B2 | 3/2014 | Gomes et al. | |
| 2006/0214480 A1 * | 9/2006 | Terech | ...................... 297/180.13 |
| 2007/0120400 A1 * | 5/2007 | Westh et al. | ............. 297/180.13 |
| 2011/0133525 A1 * | 6/2011 | Oota | ........................ 297/180.14 |

* cited by examiner

*Primary Examiner* — Rodney B White

(57) ABSTRACT

A seat may comprise a contact surface that may contact a person sitting in the seat. One or more elongated depressions may be disposed in the contact surface and, together with the person, form at least one duct wherein fluid may flow. The seat may be connected to a heating, ventilation, or air conditioning (HVAC) system which may cause fluid to flow into the at least one duct to regulate the temperature of the person. Such fluid may then dispense into a passenger compartment and change a temperature thereof.

19 Claims, 7 Drawing Sheets

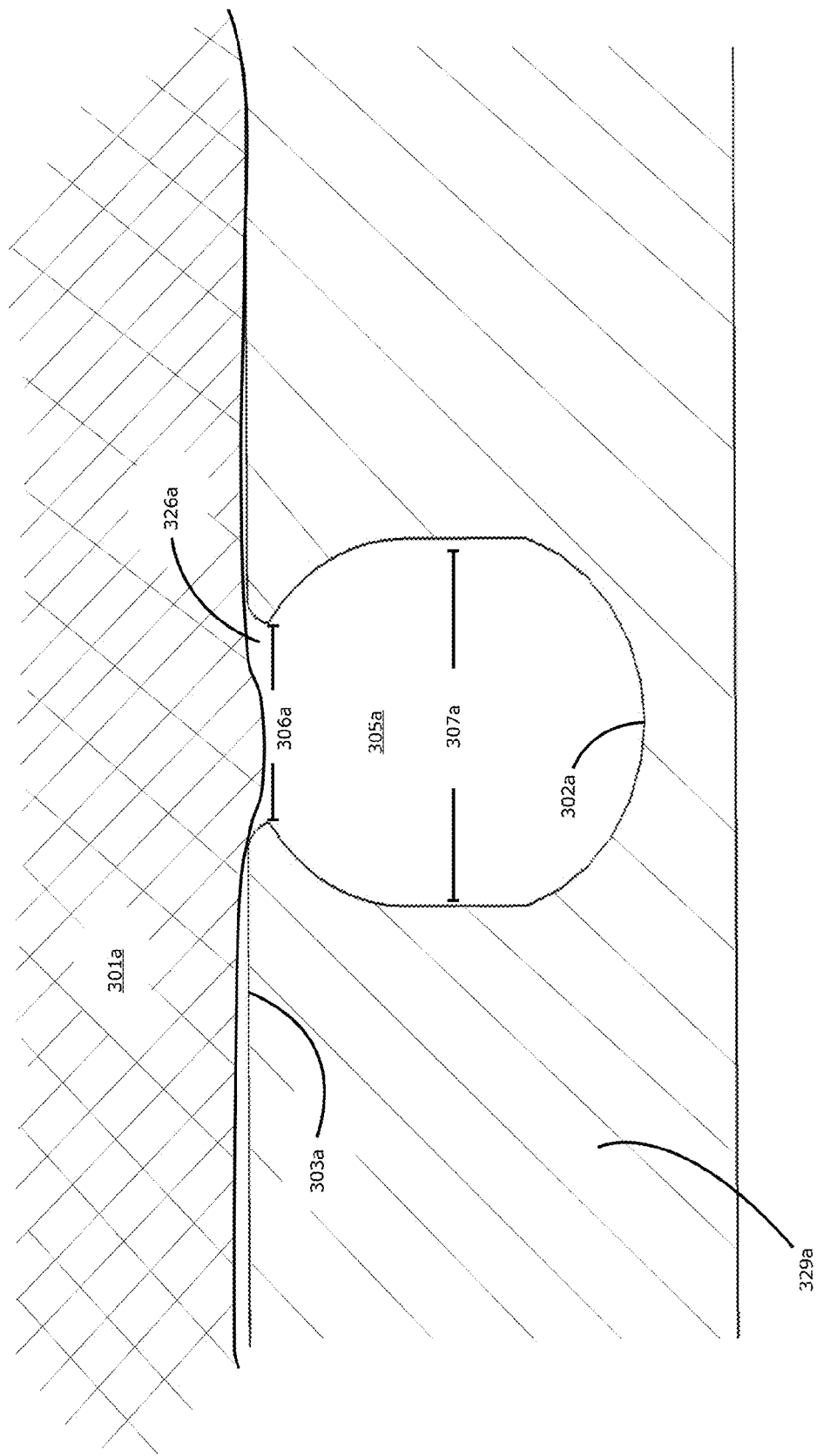

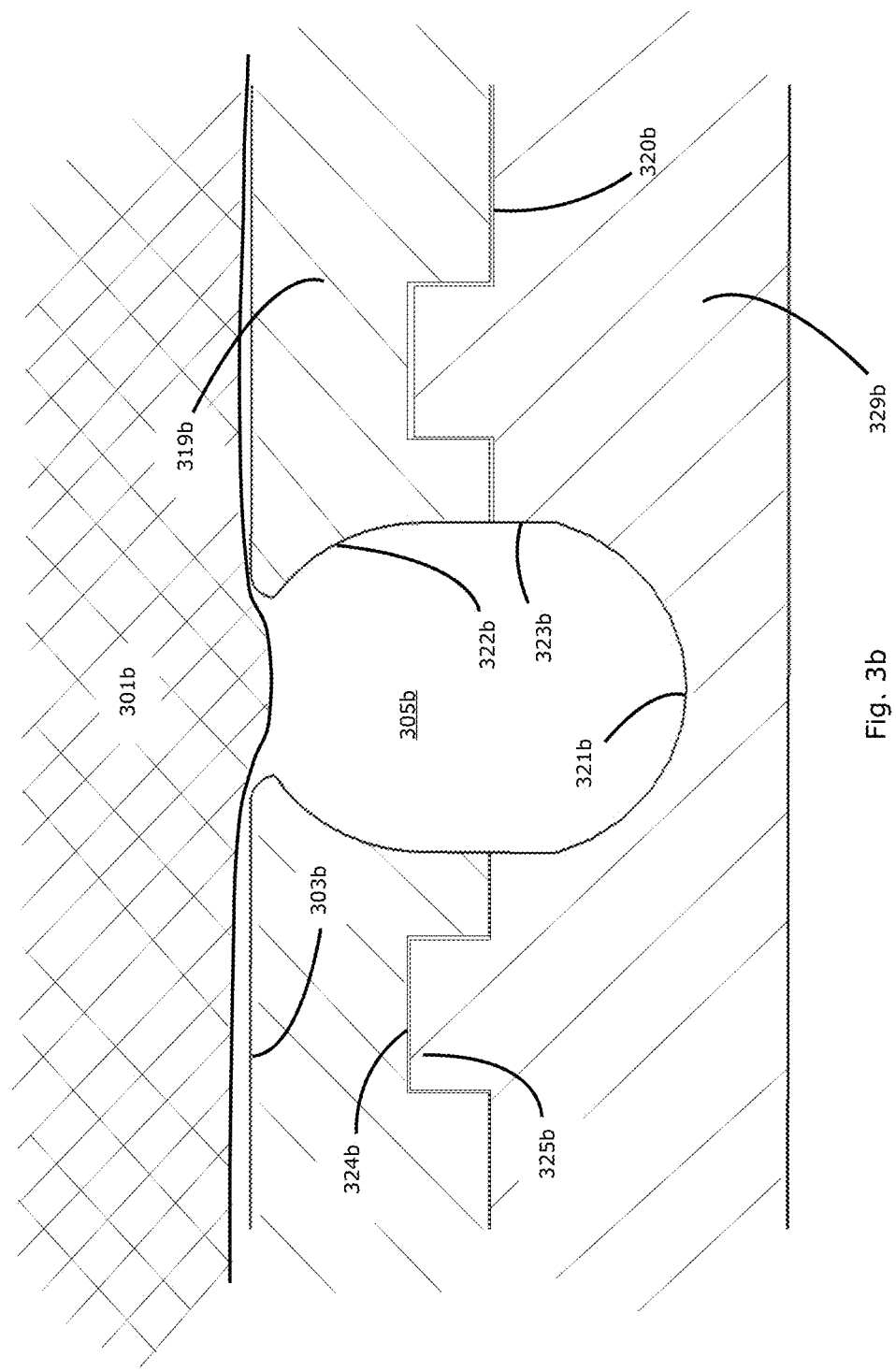

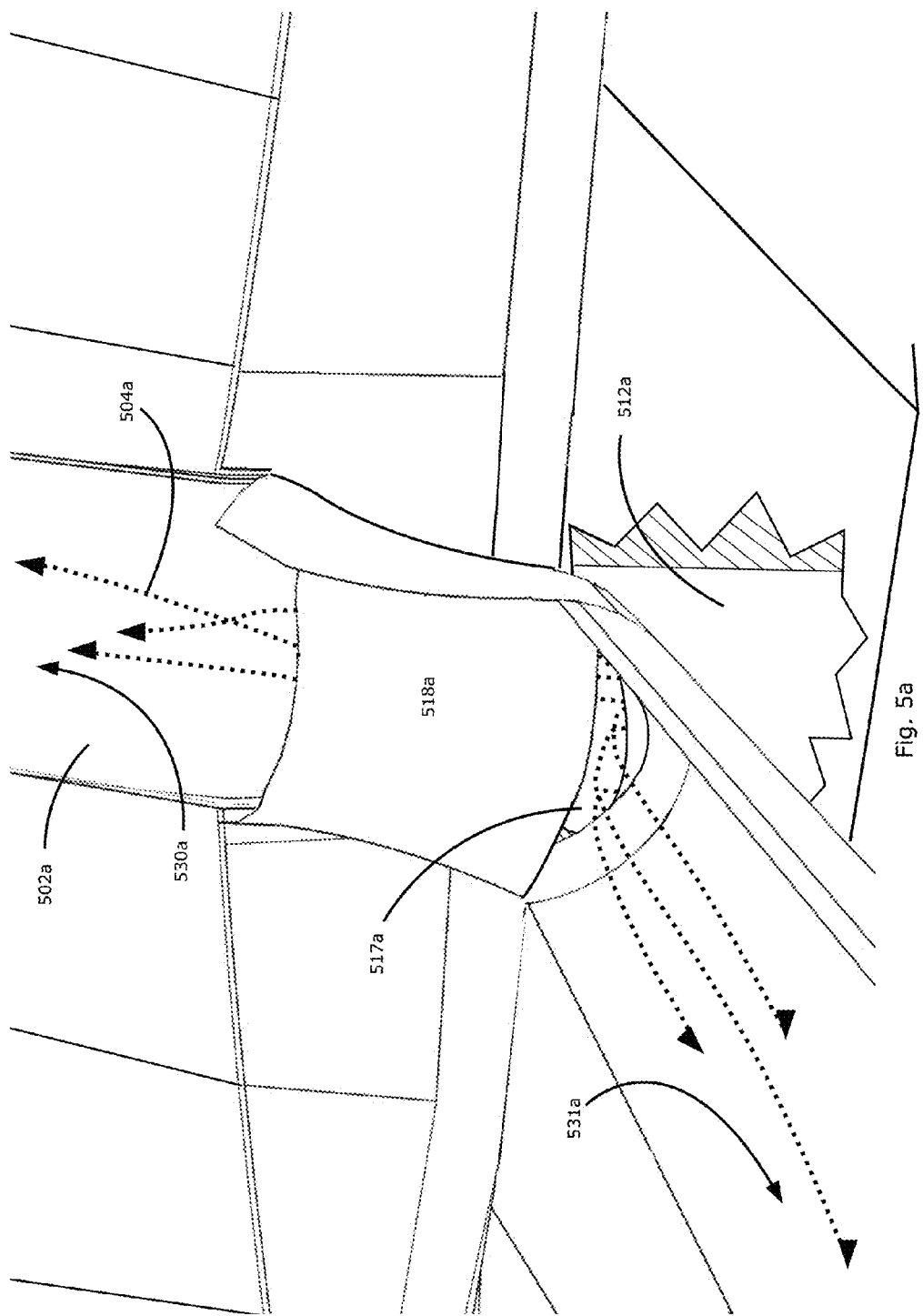

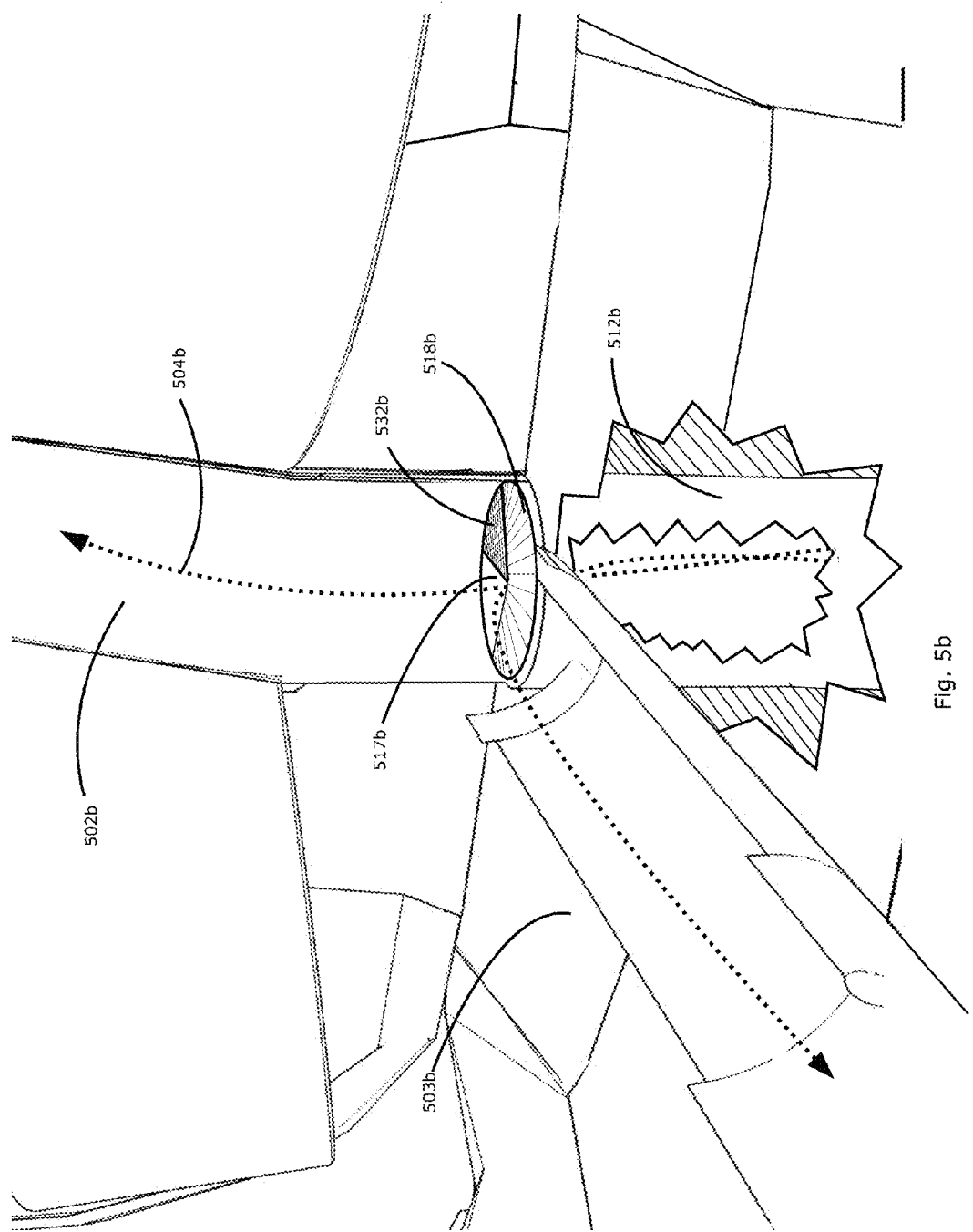

HEATING, VENTILATION, AND AIR CONDITIONING SEAT ASSEMBLY

CROSS REFERENCE TO RELATED APPLICATIONS

This patent application claims priority to U.S. Provisional Pat. App. No. 61/825,465 filed May 20, 2013, which is incorporated herein by reference for all that it contains.

BACKGROUND OF THE INVENTION

The present invention relates generally to seats that allow a user to rest in a sitting position and more specifically to seats designed to regulate the temperature of a user. The concept of temperature regulated seating is well known and especially prevalent in passenger vehicles such as automobiles, boats, airplanes, and the like.

Some have attempted to regulate the temperature of a seated person by blowing temperature regulated air on the person. A common arrangement to accomplish this is to supply air through conduits in a seat to a surface of the seat in contact with a user. The surface in contact with the user often comprises discrete air outlets or an air-permeable fabric to allow the air to impact the user.

For example, U.S. Pat. No. 6,761,399 to Bargheer et al., which is incorporated herein for all that it discloses, describes a motor vehicle seat with an air supply device integrated in its backrest and/or head restraint including an air outlet duct having an outlet opening arranged on the front side of the head restraint, for supplying the head, neck and shoulder region of an occupant with hot air, and an air inlet duct having an inlet opening arranged on the rear side of the backrest, with a heating element being assigned to the air supply device.

In another example, U.S. Pat. No. 6,976,734 to Stoewe, which is incorporated herein for all that it discloses, describes a vehicle seat with a backrest cover at least partially air permeable wherein air exchange passes through the air-permeable regions. This may take the form of a woven or knitted textile which covers a ventilating fan arranged in the backrest.

Despite the benefits of such systems, it would be desirable to have an increased amount of heat exchange between a temperature regulated seat and a user.

BRIEF SUMMARY OF THE INVENTION

A seat assembly may regulate the temperature of a user by allowing fluid to flow against the user's body before dissipating. In one embodiment, this may be accomplished by a seat assembly comprising a seat body with a contact surface in contact with a user. The contact surface may comprise one or more elongated depressions that, in combination with the user, may form at least one duct through which fluid may flow.

A cross-section of the elongated depressions may comprise an opening width at an opening that is smaller than a maximum width thereof. This may aid in preventing the user from obstructing the flow of fluid though the ducts.

The elongated depressions may taper from a central portion of the contact surface toward a distal end, an opposing distal end, or both. Other elongated depressions may extend from a central portion of the contact surface toward a peripheral portion of the contact surface and, further, may taper from the central portion toward the peripheral portion where they may comprise openings for dispensing fluid therefrom. When used in conjunction with a passenger vehicle, fluid dispensed from the opening may flow into a passenger compartment to regulate the temperature of the compartment.

At least one conduit may pass from the contact surface to an opposing surface of the seat assembly. In various embodiments the conduit may comprise at least one inlet at the opposing surface and a tube may be connected to the at least one inlet and held with a fastener. The tube may connect to a heating, ventilation, or air conditioning (HVAC) system.

The conduit may further comprise at least one outlet for fluid connection with the elongated depressions. The outlet may comprise a diffuser for dividing fluid flowing through the conduit. The outlet may also comprise a valve for controlling the volume of fluid flowing through the conduit.

The contact surface of the seat assembly may be formed at least partially from one or more cushions disposed on an inner surface thereof that may have one or more troughs disposed thereon. The cushions may be spaced from one another and may comprise peripheral edges continuous with internal surfaces of the troughs.

Further, the cushions may be detachable from the inner surface and attached to the inner surface with hook and loop fasteners, buttons, buckles, magnets, straps, slots and tabs, or a combination thereof.

BRIEF DESCRIPTION OF THE DRAWINGS

FIG. 3a is a cross-sectional view of an embodiment of a seat body with a contact surface comprising a duct formed from an elongated depression and a portion of a user.

FIG. 3b is a cross-sectional view of an embodiment of a seat assembly comprising a trough disposed between cushions.

FIG. 5a is a magnified, partially cutaway view of a diffuser disposed in an outlet of a seat assembly.

FIG. 5b is a magnified, partially cutaway view of an embodiment of a valve that may be adjusted to control a volume of fluid flowing through an outlet of a seat assembly.

DETAILED DESCRIPTION OF THE DRAWINGS

Figure 1:
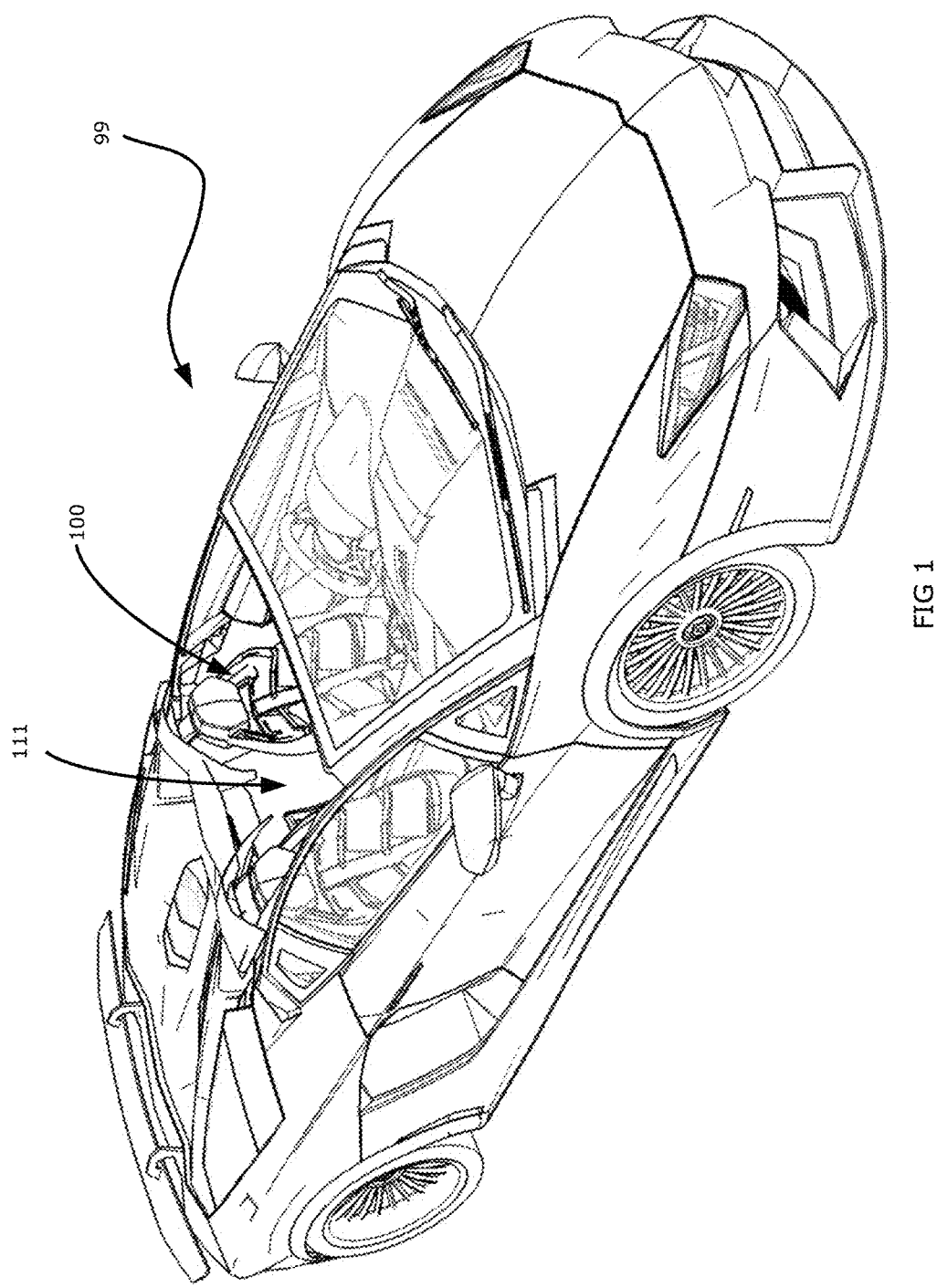
FIG. 1 is a perspective view of a vehicle comprising a passenger compartment with a seat assembly disposed therein.

In FIG. 1, an embodiment of a vehicle 99 capable of transporting a user (not shown) from one location to another is shown. A seat assembly 100 may be secured within the vehicle 99 to support the user. While the vehicle 99 is portrayed as an automobile, it should be understood that a variety of vehicle types may be used, such as, but not limited to, land vehicles, aircraft, and watercraft. It should be further understood that such a seat assembly could also be used in non-moving areas such as residential homes, professional offices, or any other place that can accommodate a seat assembly.

The vehicle 99 may comprise a passenger compartment 111 in which a user may sit. The passenger compartment 111 may be open to the environment, as shown, or closed to the environment. It may be desirable to regulate the temperature of the user. However, regulating the temperature of a user may be significantly more difficult in open compartments compared to closed compartments due to additional exposure to the environment. The present invention provides a seat assembly that makes regulating the temperature of a user easier in both open and closed environments.

Figure 2:
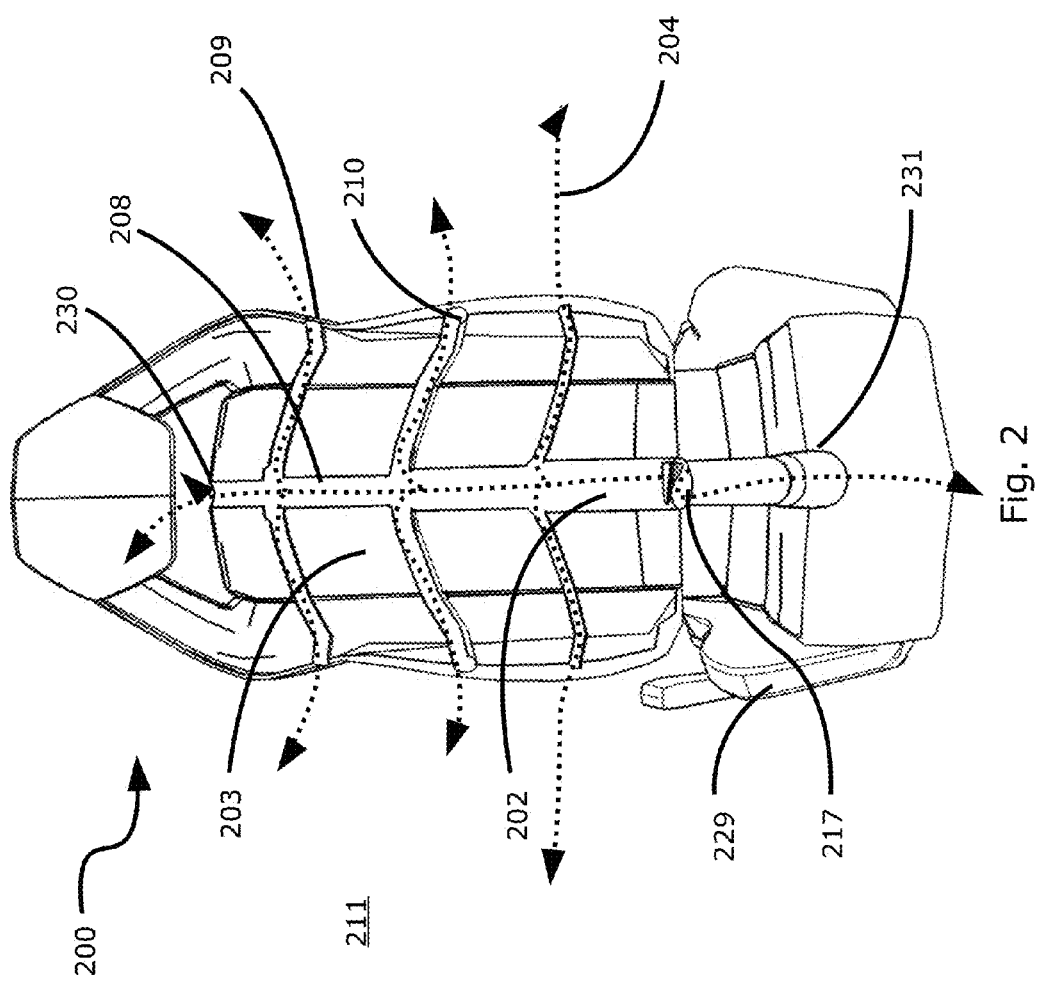
FIG. 2 is an orthogonal view of an embodiment of a seat assembly with one or more elongated depressions and a flow of fluid disposed therein.

FIG. 2 shows an embodiment of a seat assembly 200 that may help regulate the temperature of a user (not shown). The seat assembly 200 may comprise a seat body 229 that may be rigid to form a support for the user and also a contact surface 203 to make contact with the user. One or more elongated depressions 202 may be disposed in the contact surface 203.

To regulate the temperature of the user, a fluid 204 may be passed through the elongated depressions 202 for exchanging heat and/or moisture with the user. The fluid 204 may flow from one or more outlets 217 disposed in the one or more elongated depressions 202 toward a peripheral portion 209 of the contact surface 203 in order to distribute flow of fluid 204. The fluid 204 may be dispensed from one or more openings 210 at the peripheral portion 209 for ejection of the fluid 204. The ejection of the fluid 204 may contribute to regulating a temperature within a passenger compartment 211.

To maintain a relatively constant velocity of fluid 204, the cross sectional area of the elongated depressions 202 may need to be reduced. Reducing the cross sectional area may be accomplished by a tapering of the elongated depressions 202 from a central portion 208 of the contact surface 203 toward the peripheral portion 209 and/or toward a distal end 230 and/or opposing distal end 231.

FIG. 3a shows an embodiment of a contact surface 303a and a portion of a user 301a in contact with the contact surface 303a. The contact surface 303a may comprise one or more elongated depressions 302a disposed thereon. A combination of the user 301a and the elongated depressions 302a may form one or more ducts 305a through which fluid may flow. The elongated depressions 302a may comprise an opening width 306a at an opening 326a, and a maximum width 307a, wherein the opening width 306a may be smaller than the maximum width 307a to aid in preventing a portion of the user 301a from obstructing the flow of the fluid in the ducts 305a.

FIG. 3b shows an embodiment of a base 329b with one or more cushions 319b disposed on an inner surface 320b of the base 329b. The inner surface 320b may comprise one or more troughs 321b disposed thereon. The cushions 319b may be spaced on either side of the troughs 321b and comprise peripheral edges 322b continuous with an internal surface 323b of the troughs 321b. A user 301b may make contact with a contact surface 303b forming a duct 305b through which a fluid (not shown) may flow. The cushions 319b may be attached to the inner surface 320b with a tab 325b and slot 324b connection as shown. Cushions may also be attached with hook and loop fasteners, buttons, buckles, magnets, straps, or other known methods. Further, the cushions 319b may be detachable from the inner surface 320b to allow for easier cleaning and/or to exchange for a different style, shape or fabric.

Figure 4:
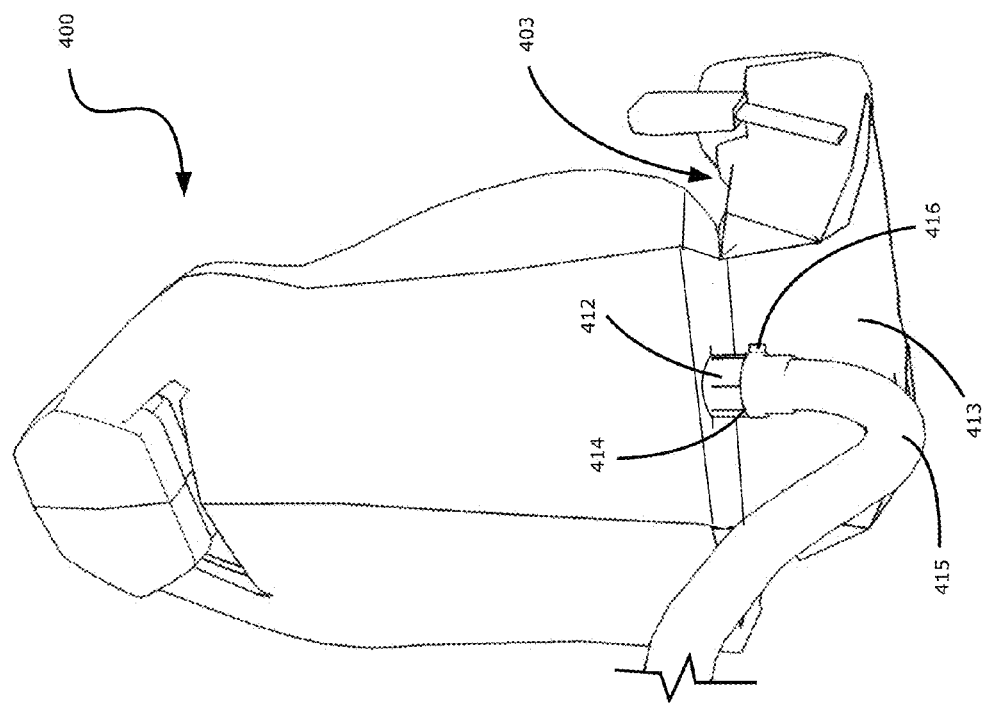
FIG. 4 is a perspective view of an embodiment of a seat assembly connected to an HVAC system (not shown).

FIG. 4 shows an embodiment of a seat assembly 400 connected to an HVAC system (not shown) by a tube 415. A conduit 412 may penetrate from a contact surface 403 through to an opposing surface 413 and comprise an inlet 414 for connection to the tube 415. The tube 415 may be connected to the inlet 414 and may be held with a fastener 416, such as, but not limited to, hook and loop fasteners, buttons, buckles, magnets, straps, slots and tabs, or other known methods. The HVAC system may pass a fluid through the tube 415 and conduit 412 to the seat assembly 400.

FIG. 5a shows an embodiment of a diffuser 518a that may be disposed in one or more elongated depressions 502a and be capable of distributing a fluid 504a from an HVAC system (not shown) into the elongated depressions 502a. The fluid 504a may flow through a conduit 512a, out from an outlet 517a, and past the diffuser 518a. The diffuser 518a may be angled in such a way to divide the flow of the fluid 504a into one or more directions through various elongated depressions 502a. A division of the flow of fluid 504a may be desirable for preventing flatulence of a user from being distributed through the one or more elongated depressions 502a toward a distal end 530a.

FIG. 5b shows an embodiment of a valve 518b and a baffle 532b that may be disposed in one or more elongated depressions 502b and capable of controlling a volume of fluid 504b flowing out from an outlet 517b and past the valve 518b, wherein the valve 518b may be rotatable relative to the baffle 532b. A valve of this type may be combined with a diffuser (not shown) to both control the volume of a flow of fluid and the direction of the flow of fluid.

Whereas the present invention has been described in particular relation to the drawings attached hereto, it should be understood that other and further modifications apart from those shown or suggested herein, may be made within the scope and spirit of the present invention.

What is claimed is:

1. A seat assembly comprising:
    a seat body comprising a contact surface for contact with a user;
    a conduit extending through the seat body for supplying a flow of fluid;
    an elongated depression disposed in the contact surface and in fluid communication with the conduit, wherein the elongated depression forms a substantially closed duct that runs parallel to the contact surface when in contact with the user and the conduit comprises an outlet disposed in the elongated depression.

2. The seat assembly of claim 1, wherein the elongated depression comprises a cross-section having an opening width at an opening thereof and a maximum width, wherein the opening width is smaller than the maximum width.

3. The seat assembly of claim 1, wherein the elongated depression tapers from a central portion of the contact surface toward at least one of a distal end of the contact surface and an opposing distal end of the contact surface.

4. The seat assembly of claim 1, wherein the elongated depression extends from a central portion of the contact surface toward a peripheral portion of the contact surface.

5. The seat assembly of claim 4, wherein the elongated depression tapers from the central portion of the contact surface toward the peripheral portion of the contact surface.

6. The seat assembly of claim 5, wherein the elongated depression comprises an opening at the peripheral portion for dispensing the fluid therefrom.

7. The seat assembly of claim 1, wherein the fluid flows from the elongated depression into a passenger compartment.

8. The seat assembly of claim 1, wherein the conduit passes from the contact surface to an opposing surface of the seat body.

9. The seat assembly of claim 8, wherein the conduit comprises an inlet at the opposing surface.

10. The seat assembly of claim 9, wherein a tube is connected to the inlet and held thereto with a fastener.

11. The seat assembly of claim 10, wherein the tube connects to at least one of a heating, ventilation, and air conditioning system.

12. The seat assembly of claim 1, wherein the outlet comprises a diffuser for dividing fluid flowing through the conduit.

13. The seat assembly of claim 1, wherein the outlet comprises a valve for controlling a volume of fluid flowing through the conduit.

14. The seat assembly of claim 1, wherein the contact surface is at least partially formed from at least one cushion disposed on an inner surface of a base.

15. The seat assembly of claim 14, wherein at least one trough is disposed on the inner surface.

16. The seat assembly of claim 15, wherein the at least one cushion comprises multiple cushions that are spaced from one another.

17. The seat assembly of claim 16, wherein the multiple cushions comprise peripheral edges continuous with an internal surface of the at least one trough.

18. The seat assembly of claim 14, wherein the at least one cushion is detachable from the inner surface.

19. The seat assembly of claim 18, wherein the at least one cushion is attached to the inner surface with at least one of hook and loop fasteners, buttons, buckles, magnets, straps, slots and tabs, and combinations thereof.

\* \* \* \* \*